US012654700B2

(12) United States Patent
Lee

(10) Patent No.: US 12,654,700 B2
(45) Date of Patent: Jun. 16, 2026

(54) DRIVER ASSISTANCE APPARATUS AND DRIVER ASSISTANCE METHOD

(71) Applicant: HL Klemove Corp., Incheon (KR)

(72) Inventor: Hoongi Lee, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 263 days.

(21) Appl. No.: 18/223,800

(22) Filed: Jul. 19, 2023

(65) Prior Publication Data

US 2024/0149876 A1    May 9, 2024

(30) Foreign Application Priority Data

Nov. 8, 2022    (KR) ......................... 10-2022-0148009

(51) Int. Cl.
*B60W 30/16*        (2020.01)
*B60W 40/12*        (2012.01)

(52) U.S. Cl.
CPC ............ *B60W 30/16* (2013.01); *B60W 40/12* (2013.01); *B60W 2420/403* (2013.01); *B60W 2420/408* (2024.01); *B60W 2554/801* (2020.02)

(58) Field of Classification Search
CPC ...... B60W 10/04; B60W 10/18; B60W 10/20; B60W 2050/0075; B60W 2050/0215; B60W 2420/403; B60W 2420/408; B60W 2554/801; B60W 2556/50; B60W 30/16; B60W 40/12; B60W 50/14
See application file for complete search history.

(56) References Cited

U.S. PATENT DOCUMENTS

2016/0039411 A1*    2/2016    Park ...................... G01S 13/931
                                                      701/70
2016/0236687 A1*    8/2016    Kuroba .............. B60W 10/188
(Continued)

FOREIGN PATENT DOCUMENTS

JP        2018-165085        10/2018
KR    10-2013-0125090        11/2013
(Continued)

OTHER PUBLICATIONS

Korean Intellectual Property Office Application No. 10-2022-0148009, Office Action dated Mar. 11, 2025, 12 pages.
(Continued)

*Primary Examiner* — Babar Sarwar
(74) *Attorney, Agent, or Firm* — LEE, HONG, DEGERMAN, KANG & WAIMEY

(57)        ABSTRACT
A driver assistance apparatus including a camera configured to obtain image data with a forward field of view of a host vehicle; a radar configured to obtain radar data with a sensing field of view in the vicinity of the host vehicle; and a controller electrically connected to the camera and the radar, wherein the controller detects a preceding vehicle traveling in front of the host vehicle based on the image data and the radar data, performs adaptive cruise control (ACC) to maintain a target inter-vehicle distance between the host vehicle and the preceding vehicle, identifies a lateral deviation of the preceding vehicle relative to the host vehicle while performing ACC; and calibrates the target inter-vehicle distance between the host vehicle and the preceding vehicle based on the lateral deviation of the preceding vehicle.

18 Claims, 10 Drawing Sheets

(56) References Cited

U.S. PATENT DOCUMENTS

| | | | | |
|---|---|---|---|---|
| 2016/0259814 A1* | 9/2016 | Mizoguchi | .............. | G06F 16/29 |
| 2017/0080940 A1* | 3/2017 | Ito | ......................... | B60W 10/18 |
| 2018/0079409 A1* | 3/2018 | Nath | ..................... | G08G 1/167 |
| 2018/0126965 A1* | 5/2018 | Tsuji | ...................... | B60T 8/245 |
| 2018/0253975 A1* | 9/2018 | Mizutani | ................ | G08G 1/167 |
| 2018/0281791 A1* | 10/2018 | Fukaya | .............. | B60W 30/095 |
| 2018/0281793 A1* | 10/2018 | Terayama | ......... | B60W 30/0956 |
| 2019/0256104 A1* | 8/2019 | Shimizu | ............ | B60W 50/0098 |
| 2019/0322277 A1* | 10/2019 | Kuroki | .................. | B60W 30/16 |
| 2020/0031349 A1* | 1/2020 | Jia | ..................... | B60W 50/0098 |
| 2020/0047772 A1* | 2/2020 | Yasue | ................... | B60W 30/16 |
| 2021/0300375 A1* | 9/2021 | Yu | ................... | B60W 30/18154 |
| 2021/0380102 A1* | 12/2021 | Kim | ....................... | B60W 10/20 |
| 2025/0214588 A1* | 7/2025 | Nishiguchi | ........... | B60W 30/16 |

FOREIGN PATENT DOCUMENTS

| | | | | |
|---|---|---|---|---|
| KR | 10-2107726 | | 5/2020 | |
| KR | 20200052589 A | * | 5/2020 | ........... B60W 40/02 |
| KR | 10-2159357 | | 9/2020 | |
| KR | 10-2183049 | | 11/2020 | |
| KR | 10-2022-0028779 | | 3/2022 | |

OTHER PUBLICATIONS

Korean Intellectual Property Office Application No. 10-2022-0148009, Office Action dated Nov. 20, 2025, 6 pages.

* cited by examiner

FIG. 6

| OFFSET AREA | TARGET INTER-VEHICLE DISTANCE |
|---|---|
| FOURTH AREA<br>( 0 < OZ ≤ 30 ) | FOURTH TARGET INTER-VEHICLE DISTANCE<br>( TARGET INTER-VEHICLE DISTANCE * 0.7 ) |
| THIRD AREA<br>( 30 < OZ ≤ 60 ) | THIRD TARGET INTER-VEHICLE DISTANCE<br>( TARGET INTER-VEHICLE DISTANCE * 0.8 ) |
| SECOND AREA<br>( 60 < OZ ≤ 90 ) | SECOND TARGET INTER-VEHICLE DISTANCE<br>( TARGET INTER-VEHICLE DISTANCE * 0.9 ) |
| FIRST AREA<br>( OZ > 90 ) | FIRST TARGET INTER-VEHICLE DISTANCE<br>( TARGET INTER-VEHICLE DISTANCE ) |

DRIVER ASSISTANCE APPARATUS AND DRIVER ASSISTANCE METHOD

CROSS-REFERENCE TO RELATED APPLICATION

Pursuant to 35 U.S.C. § 119(a), this application claims the benefit of earlier filing date and right of priority to Korean Patent Application No 10-2022-0148009, filed on Nov. 8, 2022, the contents of which are hereby incorporated by reference herein in its entirety.

BACKGROUND

Embodiments of the present disclosure relate to a driver assistance apparatus and a driver assistance method for maintaining a distance from a preceding vehicle.

In recent years, research has been actively conducted on vehicles equipped with Advanced Driver Assistance Systems (ADASs), which actively provide information on a vehicle status, a driver status, and/or a nearby environment to reduce a burden on the driver and increase convenience.

As an example of an ADAS, an adaptive cruise control (ACC) system is a convenience feature that uses radars and/or cameras mounted in front of a vehicle, referred to as a host vehicle, to detect the distance and speed relative to a preceding vehicle, and automatically decelerates/accelerates the vehicle to maintain a target inter-vehicle distance with the preceding vehicle without driver intervention.

In the related art, the ACC control maintains an inter-vehicle distance with a preceding vehicle at a target inter-vehicle distance even if the preceding vehicle is in the process of leaving the driving lane to change to an adjacent lane line.

In fact, even if the preceding vehicle is starting to move laterally away from the host vehicle, the host vehicle is unable to accelerate until the preceding vehicle is completely out of the driving lane, which may give the driver a sense of unease.

SUMMARY

Therefore, it is an aspect of the present disclosure to provide a driver assistance apparatus and a driver assistance method to accelerate a host vehicle even when a preceding vehicle is not completely out of the driving lane by means of calibrating a target inter-vehicle distance based on an extent to which the preceding vehicle deviates laterally from the host vehicle.

Additional aspects of the disclosure will be set forth in part in the description which follows and, in part, will be obvious from the description, or may be learned by practice of the disclosure.

In accordance with one aspect of the present disclosure, a driver assistance apparatus includes: a camera configured to obtain image data with a forward field of view of a host vehicle; a radar configured to obtain radar data with a sensing field of view in a vicinity of the host vehicle; and a controller electrically connected to the camera and the radar, wherein the controller is configured to: detect a preceding vehicle traveling in front of the host vehicle based on at least one of the image data or the radar data; perform adaptive cruise control (ACC) to maintain a target inter-vehicle distance between the host vehicle and the preceding vehicle; identify a lateral deviation of the preceding vehicle relative to the host vehicle while performing ACC; and calibrate the target inter-vehicle distance between the host vehicle and the preceding vehicle based on the lateral deviation of the preceding vehicle.

In some embodiments, the controller may obtain a lateral position of the preceding vehicle relative to the host vehicle to identify the lateral deviation of the preceding vehicle.

In some embodiments, the lateral position of the preceding vehicle relative to the host vehicle is based on a vehicle width of the preceding vehicle and a distance between a central axis of the host vehicle and a central axis of the preceding vehicle.

In some embodiments, the controller may identify an offset area of the preceding vehicle relative to the host vehicle based on the lateral position of the preceding vehicle and a vehicle width of the host vehicle, and identify the lateral deviation of the preceding vehicle based on the offset area.

In some embodiments, the offset area of the preceding vehicle relative to the host vehicle is an area in which a width of the host vehicle laterally overlaps with a width the preceding vehicle with respect to forward alignment of the preceding vehicle and the host vehicle.

In some embodiments, the offset area decreases as the lateral deviation of the preceding vehicle increases.

In some embodiments, the lateral deviation of the preceding vehicle comprises at least one of an extent to which the preceding vehicle deviates from a center of a traveling lane or an extent to which the preceding vehicle leaves the traveling lane.

In some embodiments, the target inter-vehicle distance is calibrated based on the lateral deviation of the preceding vehicle to be decreased from a target inter-vehicle distance set by a driver.

In some embodiments, the target inter-vehicle distance is calibrated to be further decreased as the lateral deviation of the preceding vehicle increases.

In accordance with another aspect of the present disclosure, a driver assistance apparatus includes: a camera configured to obtain image data with a forward field of view of a host vehicle; a radar configured to obtain radar data with a sensing field of view in a vicinity of the host vehicle; and a controller electrically connected to the camera and the radar, wherein the controller is configured to: obtain a lateral position of a preceding vehicle relative to the host vehicle while performing adaptive cruise control (ACC) to maintain a target inter-vehicle distance between the host vehicle and the preceding vehicle traveling in front of the host vehicle based on at least one of the image data or the radar data; identify an offset area of the preceding vehicle relative to the host vehicle based on the lateral position of the preceding vehicle and a vehicle width of the host vehicle; and calibrate the target inter-vehicle distance between the host vehicle and the preceding vehicle based on the offset area.

In some embodiments, the target inter-vehicle distance is calibrated based on the offset area to be decreased from a target inter-vehicle distance set by a driver.

In some embodiments, the target inter-vehicle distance is calibrated to be further decreased as the offset area decreases.

In accordance with still another aspect of the present disclosure, a driver assistance method includes: detecting a preceding vehicle traveling in front of a host vehicle; performing adaptive cruise control (ACC) to maintain a target inter-vehicle distance between the host vehicle and the preceding vehicle; identifying a lateral deviation of the preceding vehicle relative to the host vehicle while performing ACC; and calibrating the target inter-vehicle distance between the host vehicle and the preceding vehicle based on the lateral deviation of the preceding vehicle relative to the host vehicle.

In some embodiments, the method may further include obtaining a lateral position of the preceding vehicle for identifying the lateral deviation of the preceding vehicle.

In some embodiments, identifying the lateral deviation of the preceding vehicle is based on obtaining a vehicle width of the preceding vehicle and a distance between a central axis of the host vehicle and a central axis of the preceding vehicle.

In some embodiments, identifying the lateral deviation of the preceding vehicle comprises: identifying an offset area of the preceding vehicle relative to the host vehicle based on the lateral position of the preceding vehicle and a vehicle width of the host vehicle.

In some embodiments, the offset area decreases as the lateral deviation of the preceding vehicle increases.

In some embodiments, the identifying the lateral deviation of the preceding vehicle comprises identifying at least one of an extent to which the preceding vehicle deviates from a center of a traveling lane or an extent to which the preceding vehicle leaves the traveling lane.

In some embodiments, the target inter-vehicle distance is calibrated based on the lateral deviation of the preceding vehicle to be decreased from a target inter-vehicle distance set by a driver.

In some embodiments, the target inter-vehicle distance is calibrated to be further decreased as the lateral deviation of the preceding vehicle increases.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is a view for describing a calibrated target inter-vehicle distance by the offset area of the preceding vehicle relative to the host vehicle in the driver assistance apparatus according to one embodiment.

DETAILED DESCRIPTION

Figure 1:
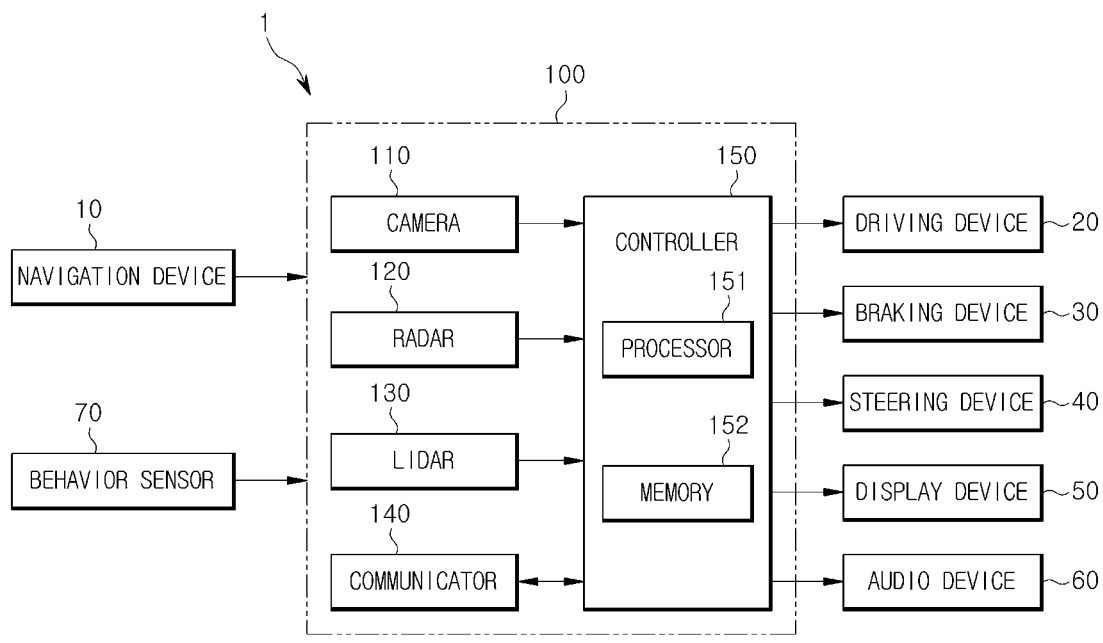
FIG. 1 is a view illustrating a driver assistance apparatus according to one embodiment and a constitution of a vehicle to which the driver assistance apparatus is applied.

Like reference numerals indicate like constituent elements throughout the specification. The present specification does not describe all elements of the embodiments, and omits the description that is general in the art to which the present disclosure belongs or that is repetitive between embodiments. The term "part, module, member, or block" as used in the specification may be implemented in software or hardware, and according to embodiments, a plurality of "parts, modules, members, or blocks" may be implemented as a single component element, or a single "part, module, member, or block" may include a plurality of component elements.

Throughout the specification, when one constituent element is referred to as being "connected" to another constituent element, which includes not only a direct connection, but also an indirect connection, and the indirect connection includes a connection via a wireless communication network.

In addition, unless explicitly described to the contrary, the word "comprise/include" and variations such as "comprises/includes" or "comprising/including" will be understood to imply the inclusion of stated elements, not the exclusion of any other elements.

Throughout the specification of the present application, when one member is disposed "on" another member, this includes not only a case where the one member is brought into contact with another member, but also a case where still another member is present between the two members.

The terms first, second, and the like are used to distinguish one constituent element from another constituent element, and the constituent elements are not limited by the aforementioned terms. Singular expressions include plural expressions, unless the context clearly indicates otherwise.

The identifiers in each step are for descriptive convenience only, and the identifiers do not describe the order of the steps, and the steps may be performed in any order other than the order described unless the context clearly indicates a specified order.

Figure 2:
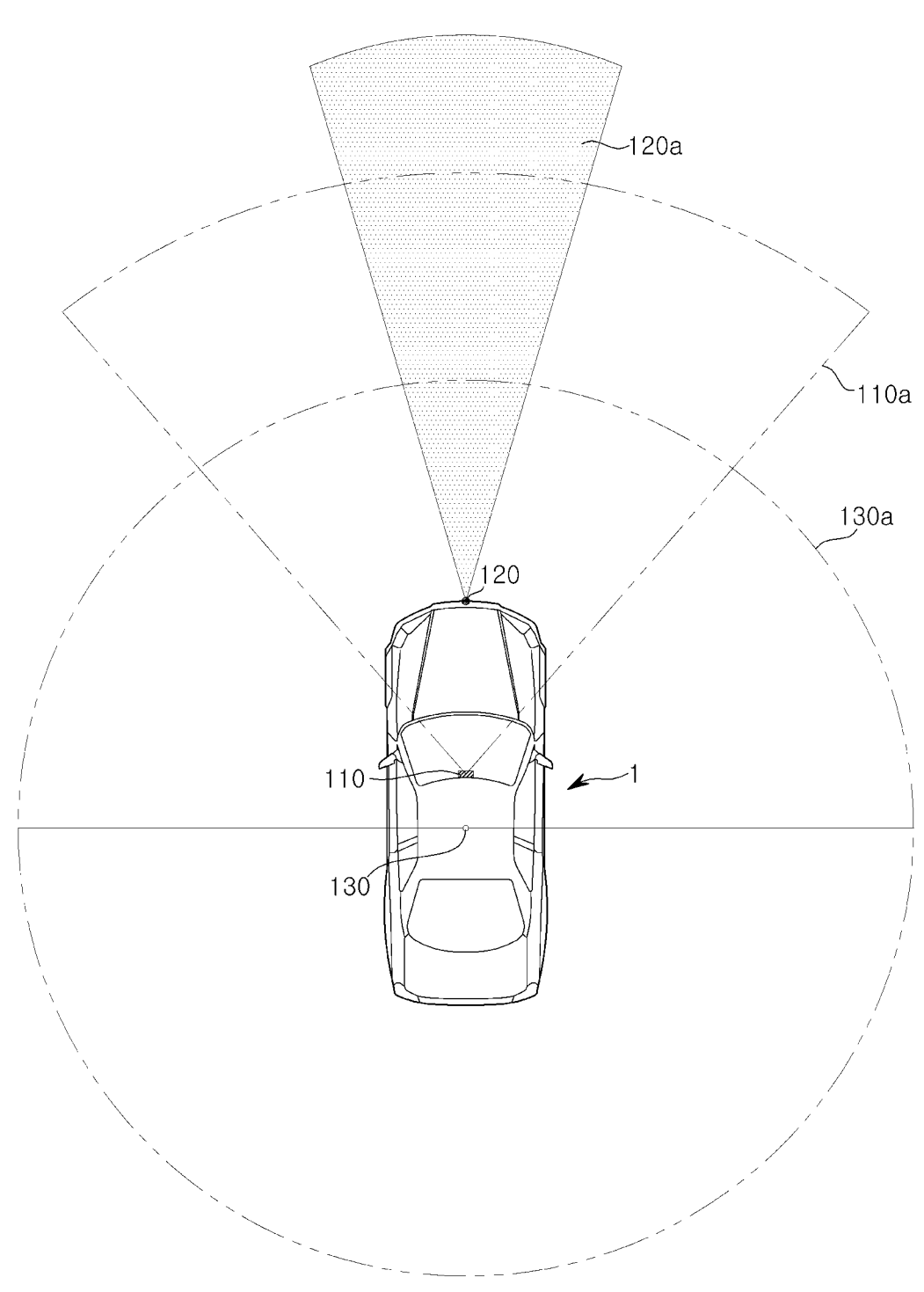
FIG. 2 is a view illustrating fields of view of a camera, a radar, and a lidar included in the driver assistance apparatus according to one embodiment.

FIG. 1 is a view illustrating a driver assistance apparatus according to one embodiment and a constitution of a vehicle to which the driver assistance apparatus is applied. FIG. 2 is a view illustrating fields of view of a camera, a radar, and a lidar included in the driver assistance apparatus according to one embodiment.

With reference to FIG. 1, a vehicle 1 may include a navigation device 10, a driving device 20, a braking device 30, a steering device 40, a display device 50, an audio device 60, a behavior sensor 70, and/or a driver assistance apparatus 100.

Some or all of the above elements may communicate with each other via a communication network for a vehicle (NT). For example, the electrical devices 10, 20, 30, 40, 50, 60, 70, and 100 included in the vehicle 1 may transmit and receive data via Ethernet, media oriented systems transport (MOST), FlexRay, controller area network (CAN), local interconnect network (LIN), and the like.

The navigation device 10 may generate a route to a destination input by a driver and provide the generated route to the driver. The navigation device 10 may receive a GNSS signal from a global navigation satellite system (GNSS) and identify an absolute position (coordinates) of the vehicle 1 based on the GNSS signal. The navigation device 10 may generate a route to the destination based on a position (coordinates) of the destination input by the driver and the current position (coordinates) of the vehicle 1.

The navigation device 10 may provide map data and position information on the vehicle 1 to the driver assistance apparatus 100. In addition, the navigation device 10 may provide information on the route to the destination to the driver assistance apparatus 100. For example, the navigation device 10 may provide the driver assistance apparatus 100 with information on a roadway on which the vehicle 1 is traveling (e.g., bus only lane, a lane under construction, a restricted lane, a lane that is ending, etc.).

The driving device 20 moves the vehicle 1 and may include, for example, an engine, an engine management system (EMS), a transmission, and a transmission control unit (TCU). The engine generates power for the vehicle 1 to travel, and the engine management system may control the engine in response to a driver's intent to accelerate via an accelerator pedal or a request from the driver assistance apparatus 100. The transmission decelerates and transmits power generated by the engine to wheels, and the transmission control unit may control the transmission in response to a shift command from the driver via a shift lever and/or a request from the driver assistance apparatus 100.

The braking device 30 stops the vehicle 1 and may include, for example, a brake caliper and an electronic brake control module (EBCM). The brake caliper may utilize friction with a brake disc to decelerate the vehicle 1 or stop the vehicle 1, and the EBCM may control the brake caliper in response to the driver's intent to brake via a brake pedal and/or a request from the driver assistance apparatus 100. For example, the EBCM may receive a deceleration request from the driver assistance apparatus 100 that includes a deceleration rate, and may electrically or hydraulically control the brake caliper to decelerate the vehicle 1 depending on the requested deceleration rate.

The steering device 40 may include an electronic power steering control module (EPS). The steering device 40 may change a direction of travel of the vehicle 1, and the electric power steering control module may assist an operation of the steering device 40 in response to the driver's intent to steer via a steering wheel to facilitate the driver's operation of the steering wheel. Additionally, the electronic power steering control module may control the steering device in response to a request from the driver assistance apparatus 100. For example, the electronic power steering control module may receive a steering request including a steering torque from the driver assistance apparatus 100 and control the steering device to steer the vehicle 1 depending on the requested steering torque.

The display device 50 may include a cluster, a head-up display, a center fascia monitor, or the like, and may provide various information and entertainment to the driver via images, video, sound, or other feedback. For example, the display device 50 may provide the driver with traveling information, warning messages, etc. of the vehicle 1.

The audio device 60 may include a plurality of speakers, and may provide various information and entertainment to the driver via sound. For example, the audio device 60 may provide the driver with traveling information, warning messages, etc. of the vehicle 1.

The behavior sensor 70 may obtain behavior data that represents a motion of the vehicle 1. For example, the behavior sensor 70 may include a speed sensor that detects a rotational speed of a wheel, an acceleration sensor that detects a transverse acceleration and a longitudinal acceleration of the vehicle 1, a yaw rate sensor that detects a yaw rate of the vehicle, a steering angle sensor that detects a steering angle of a steering wheel, a torque sensor that detects a steering torque of a steering wheel, and/or a turn signal sensor that detects operational information on a turn signal. The behavior data may include a wheel speed, a transverse acceleration, a longitudinal acceleration, a yaw rate, a steering angle, a steering torque, and/or turn signal operation information.

The driver assistance apparatus 100 may communicate with the navigation device 10, the driving device 20, the braking device 30, the steering device 40, the display device 50, the audio device 60, and the behavior sensor 70 via a communication network for a vehicle. The driver assistance apparatus 100 may receive information on a route to a destination and position information on the vehicle 1 from the navigation device 10, and may obtain information on a wheel speed, a transverse acceleration, a longitudinal acceleration, a yaw rate, a steering angle, and/or a steering torque of the vehicle 1 from the behavior sensor 70.

The driver assistance apparatus 100 may provide various functions for safety to the driver. For example, the driver assistance apparatus 100 may provide a function of adaptive cruise control (ACC). In addition, the driver assistance apparatus 100 may provide functions such as lane departure warning (LDW), lane keeping assist (LKA), high beam assist (HBA), autonomous emergency braking (AEB), traffic sign recognition (TSR), blind spot detection (BSD), traffic jam assist (TJA), and the like.

The driver assistance apparatus 100 may include a camera 110, a radar 120, a lidar 130, a communicator 140, and a controller 150. The driver assistance apparatus 100 is not limited to that illustrated in FIG. 1. For example, it will be understood by those of ordinary skill in the art that in the driver assistance apparatus 100 at least one detection device of the camera 110, the radar 120, or the lidar 130 may be omitted, or various other devices that are capable of detecting nearby objects of the vehicle 1 or providing functionality for driver assistance may be added.

The camera 110, the radar 120, the lidar 130, the communicator 140, and the controller 150 may be provided separately from each other. For example, the controller 150 may be mounted in a housing that is separate from a housing of the camera 110, a housing of the radar 120, and a housing of the lidar 130. The controller 150 may transmit and receive data to and from the camera 110, the radar 120, or the lidar 130 over a network, such as broadband.

At least some of the camera 110, the radar 120, the lidar 130, the communicator 140, or the controller 150 may be integrally provided. For example, the camera 110 and the controller 150 may be provided in a single housing, the radar 120 and the controller 150 may be provided in a single housing, the lidar 130 and the controller 150 may be provided in a single housing, or the communicator 140 and the controller 150 may be provided in a single housing.

The camera 110 may photograph a vicinity of the vehicle 1 and obtain image data of the vicinity of the vehicle 1. For example, the camera 110 may be mounted on a front windshield of the vehicle 1, as illustrated in FIG. 2, and may have a field of view 110a facing the front of the vehicle 1.

The camera 110 may include a plurality of lenses and an image sensor. The image sensor may include a plurality of photodiodes that convert light into electrical signals, and the plurality of photodiodes may be disposed in a two-dimensional matrix.

The image data may include information on other vehicles, pedestrians, cyclists, or lane lines located in the vicinity of the vehicle 1.

The driver assistance apparatus 100 may include an image processor that processes image data from the camera 110, and the image processor may be integrally provided with the camera 110, for example, or may be integrally provided with the controller 150.

The image processor may obtain image data from the image sensor of the camera 110, and may detect and identify nearby objects of the vehicle 1 based on the processing of the image data. For example, the image processor may use image processing to generate tracks that are representative of nearby objects of the vehicle 1, and classify the tracks. The image processor may identify whether the track is another vehicle, a pedestrian, a cyclist, etc. and assign an identification code to the track.

The image processor may transmit data regarding tracks (or the positions and classification of tracks) in the vicinity of the vehicle 1 (hereinafter referred to as "a camera track") to the controller 150.

The radar 120 may emit transmitted radio waves in a vicinity of the vehicle 1 and detect nearby objects of the vehicle 1 based on reflected radio waves reflected from the nearby objects. For example, the radar 120 may be mounted on a grille or bumper of the vehicle 1, as illustrated in FIG. 2, and may have a sensing field of view 120a facing the front of the vehicle 1.

The radar 120 may include a transmitting antenna (or transmitting antenna array) that emits transmitted radio waves in a vicinity of the vehicle 1, and a receiving antenna (or receiving antenna array) that receives reflected radio waves that are reflected by an object.

The radar 120 may obtain radar data from transmitted radio waves transmitted by the transmitting antenna and reflected radio waves received by the receiving antenna. The radar data may include position information (e.g., distance information) and/or speed information on objects located in front of the vehicle 1.

The driver assistance apparatus 100 may include a signal processor that processes radar data from the radar 120, and the signal processor may be integrally provided with the radar 120, for example, or may be integrally provided with the controller 150.

The signal processor may obtain radar data from the receiving antenna of the radar 120 and generate a track that is representative of an object by clustering reflection points of the reflected signal. The signal processor may, for example, obtain a distance of the track based on a time difference between transmission time of the transmitted radio wave and reception time of the reflected radio wave, and a relative speed of the track based on a difference between a frequency of the transmitted radio wave and a frequency of the reflected radio wave.

The signal processor may transmit data related to a track (for example, distance and relative speed of the track) in the vicinity of the vehicle 1 obtained from radar data (hereinafter referred to as "a radar track") to the controller 150.

The lidar 130 may emit light (e.g., infrared light) in a vicinity of the vehicle 1 and detect a nearby object of the vehicle 1 based on reflected light that is reflected from the nearby object. For example, the lidar 130 may be mounted on a roof of the vehicle 1, as illustrated in FIG. 2, and may have a field of view 130a directed in all directions in the vicinity of the vehicle 1.

The lidar 130 may include a light source (e.g., light emitting diode, light emitting diode array, laser diode, or laser diode array) that emits light (e.g., infrared light, etc.), and a light sensor (e.g., photodiode or photodiode array) that receives light (e.g., infrared light, etc.). In addition, as needed, the lidar 130 may further include a driving device to rotate the light source and/or the light sensor.

The lidar 130 may emit light through the light source and receive light reflected from the object through the light sensor while the light source and/or the light sensor are rotated, thereby obtaining lidar data.

The lidar data may include relative positions of nearby objects of the vehicle 1 (distances of nearby objects and/or directions of nearby objects) and/or relative speeds.

The driver assistance apparatus 100 may include a signal processor to be capable of processing lidar data from the lidar 130, and the signal processor may be integrally provided with the lidar 130, for example, or may be integrally provided with the controller 150.

The signal processor may generate a track that is representative of an object by clustering reflection points from reflected light. The signal processor may obtain a distance to an object based on, for example, a time difference between light transmission time and light reception time. Further, the signal processor may obtain an orientation (or angle) of an object with respect to a traveling direction of the vehicle 1 based on a direction from which the light source emits light when the light sensor receives the reflected light.

The signal processor may transmit data related to a track (or distance and relative speed of the track) in the vicinity of the vehicle 1 obtained from lidar data (hereinafter referred to as "a lidar track") to the controller 150.

The communicator 140 may be provided with vehicle-to-vehicle communication data related to position and traveling information on other vehicles in the vicinity of the vehicle 1 via vehicle-to-vehicle wireless communication (V2X).

The controller 150 may be electrically connected to the camera 110, the radar 120, the lidar 130, and/or the communicator 140. Additionally, the controller 150 may be connected to the navigation device 10, the driving device 20, the braking device 30, the steering device 40, the display device 50, the audio device 60, and/or the behavior sensor 70 via an in-vehicle communication network (NT).

The controller 150 may process a camera track (or image data) from the camera 110, a radar track (or radar data) from the radar 120, a lidar track (or lidar data) from the lidar 130, and/or vehicle-to-vehicle communication data from the communicator 140, and provide control signals to the driving device 20, the braking device 30, and/or the steering device 40.

The controller 150 may include a processor 151 and a memory 152.

The memory 152 may store programs and/or data for processing the image data, the radar data, and/or the lidar data. In addition, the memory 152 may store programs and/or data for generating driving/braking/steering signals.

The memory 152 may temporarily store the image data received from the camera 110, the radar data received from the radar 120, the lidar data received from the lidar 130, the vehicle-to-vehicle communication data received from the communicator 140, and temporarily store processing results of the image data, the radar data, the lidar data, and/or the vehicle-to-vehicle communication data processed by the processor 151.

Additionally, the memory 152 may include a high definition map (HD Map). Unlike a regular map, the high definition map may include detailed information on the surface of a road or intersection, such as lane lines, traffic lights, intersections, and road signs. In particular, landmarks may be implemented in three dimensions (e.g., lane lines, traffic lights, intersections, road signs, etc.) that the vehicle encounters while traveling in the high definition map.

The memory 152 may include a volatile memory, such as an S-RAM and a D-RAM, as well as a non-volatile memory, such as a flash memory, a read only memory (ROM), and an erasable programmable read only memory (EPROM).

The processor 151 may process a camera track from the camera 110, a radar track from the radar 120, a lidar track from the lidar 130, and/or vehicle-to-vehicle communication data from the communicator 140. For example, the processor 151 may fuse the camera track, the radar track, the lidar track, and/or the vehicle-to-vehicle communication data, and output a fusion track.

The processor 151 may, based on the processing of the fusion track, generate driving signals, braking signals, and/or steering signals for controlling the driving device 20, the braking device 30, and/or the steering device 40, respectively.

The processor 151 may be an image processor that processes image data from the camera 110, or a signal processor that processes radar data from the radar 120, lidar data, and/or vehicle-to-vehicle communication data. Further, the processor 151 may be implemented using at least one of application specific integrated circuits (ASICs), digital signal processors (DSPs), digital signal processing devices (DSPDs), programmable logic devices (PLDs), field programmable gate arrays (FPGAs), microcontrollers, or microprocessors.

As described above, the controller 150 may provide driving signals, braking signals, or steering signals based on the image data from the camera 110, the radar data from the radar 120, the lidar data from the lidar 130, and/or the vehicle-to-vehicle communication data.

The controller 150 may calibrate a target inter-vehicle distance based on an extent to which a preceding vehicle (2 in FIG. 5) deviates laterally from the host vehicle 1, thereby allowing the host vehicle to accelerate even when the preceding vehicle 2 is not completely out of the traveling lane, which minimizes a driver's sense of unease.

Figure 3:
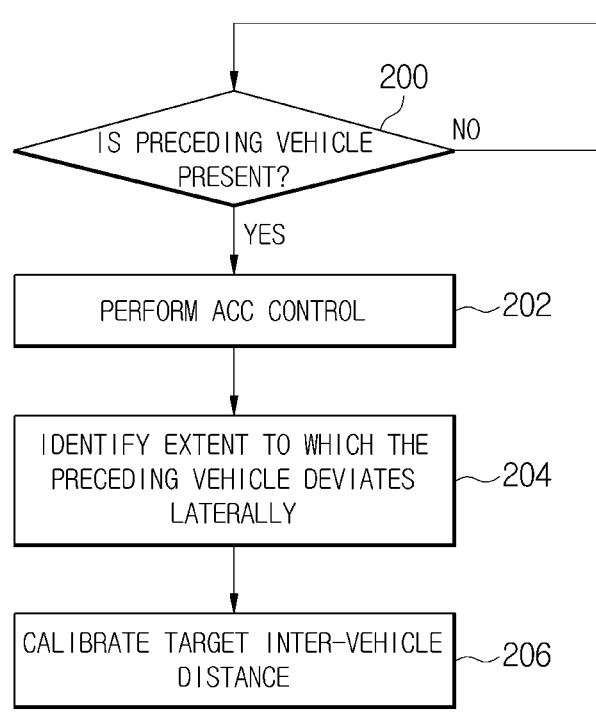
FIG. 3 is a flowchart illustrating an operation of the driver assistance apparatus according to one embodiment.

FIG. 3 is a flowchart illustrating an operation of the driver assistance apparatus according to one embodiment.

With reference to FIG. 3, the driver assistance apparatus 100 identifies whether a preceding vehicle 2 is present (200).

The controller 150 may obtain a target speed and a target inter-vehicle distance based on a driver input related to ACC control. The controller 150 may execute the ACC control based on the target speed and the target inter-vehicle distance input by the driver.

The controller 150 may determine whether the preceding vehicle 2 is present in the traveling lane in which the host vehicle 1 is traveling while the ACC control is being executed.

The controller 150 may determine whether the preceding vehicle 2 is present in the traveling lane in which the host vehicle 1 is traveling by using at least one of the camera track from the camera 110, the radar track from the radar 120, the lidar track from the lidar 130, and/or the vehicle-to-vehicle communication data from the communicator 140, or by fusing the data of some or all of the above.

The driver assistance apparatus 100 may repeatedly perform the determination of whether a preceding vehicle 2 is present in the traveling lane based on an initial determination that a preceding vehicle 2 is not present. In this case, the driver assistance apparatus 100 may continue to perform determinations on whether a preceding vehicle 2 is present while performing ACC to maintain the speed of the host vehicle 1 at the target speed set by the driver.

Based on a determination that a preceding vehicle is present (200), the driver assistance apparatus 100 may perform ACC control to maintain the inter-vehicle distance between the host vehicle 1 and the preceding vehicle 2 at a target inter-vehicle distance (202).

The driver assistance apparatus 100 may identify an extent to which the preceding vehicle 2 deviates laterally from the host vehicle 1 (204).

When the preceding vehicle 2, which is being followed by the host vehicle 1, changes lanes to a next lane line, the preceding vehicle 2 first gradually deviates laterally from the host vehicle 1 within the traveling lane and then completely leaves the traveling lane. Therefore, by tracking a lateral motion of the preceding vehicle 2 relative to the host vehicle 1, it is possible to identify the extent to which the preceding vehicle 2 is deviating laterally from the host vehicle 1. In some embodiments, the extent of deviation is identified from the time the preceding vehicle 2 begins to deviate laterally from the host vehicle 1, and until the preceding vehicle 2 has completely departed from the traveling lane.

In some embodiments, the extent to which the preceding vehicle 2 deviates laterally from the host vehicle 1, also referred to as the lateral deviation of the preceding vehicle 2, may be based on a lateral position of the preceding vehicle 2 relative to the host vehicle 1, an extent to which the preceding vehicle 2 deviates from the center of the traveling lane, or an extent to which the preceding vehicle 2 leaves the traveling lane.

The driver assistance apparatus 100 may calibrate a target inter-vehicle distance for ACC control based on the extent to which the preceding vehicle 2 deviates laterally from the host vehicle 1 (206).

Figure 4:
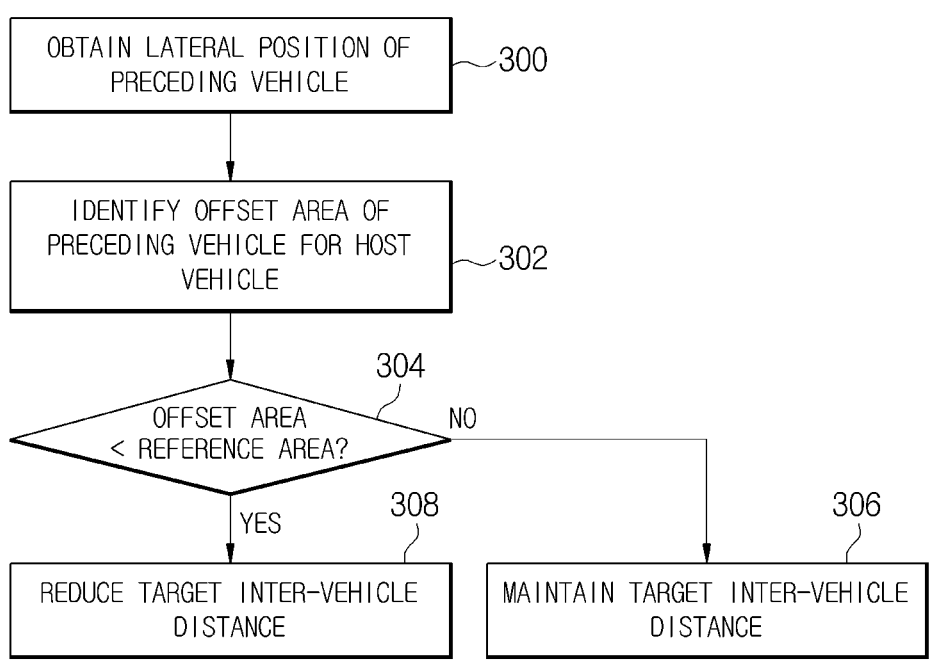
FIG. 4 is a flowchart illustrating a detailed operation of the driver assistance apparatus according to one embodiment.

FIG. 4 is a flowchart illustrating a detailed operation of the driver assistance apparatus according to one embodiment.

With reference to FIG. 4, the driver assistance apparatus 100 may obtain a lateral position of the preceding vehicle 2 (300).

For example, the controller 150 may obtain forward image data through the camera 110, analyze the forward image data to obtain a vehicle width of the preceding vehicle 2, obtain a relative distance between a central axis of the host vehicle 1 and a central axis of the preceding vehicle 2, and obtain lateral position information on the preceding vehicle 2 relative to the host vehicle 1 based on the obtained vehicle width and distance.

The driver assistance apparatus 100 may identify an offset area OZ of the preceding vehicle 2 relative to the host vehicle 1 based on the lateral position information on the preceding vehicle 2 and the vehicle width information on the host vehicle 1 (302).

Figure 5:
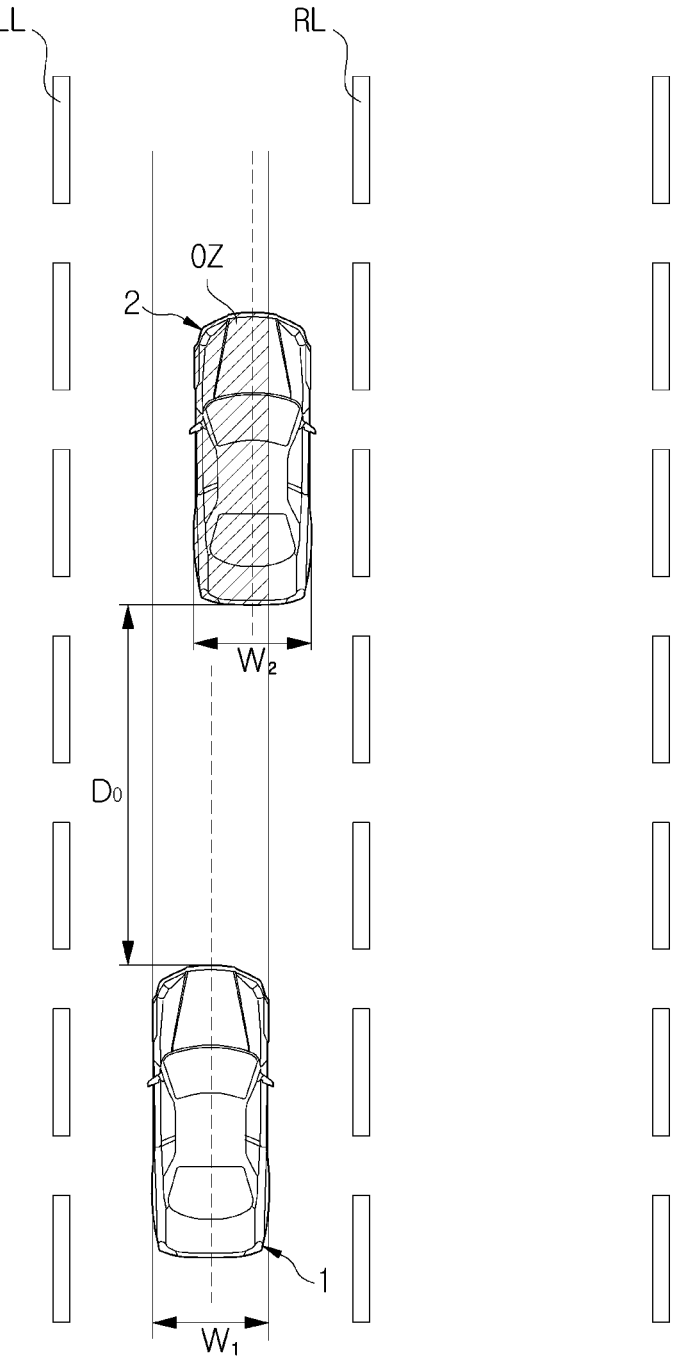
FIG. 5 is a view for describing an offset area of a preceding vehicle relative to a host vehicle in the driver assistance apparatus according to one embodiment.

FIG. 5 is a view for describing an offset area of the preceding vehicle relative to the host vehicle in the driver assistance apparatus according to one embodiment.

With reference to FIG. 5, the offset area OZ of the preceding vehicle 2 relative to the host vehicle 1 may be an area representing an amount by which a width W1 of the host vehicle 1 laterally overlaps with a width W2 of the preceding vehicle 2 with respect to forward alignment of the vehicles.

For example, the offset area OZ represents the amount of the preceding vehicle 2 that is present within two width lines which extend forward and correspond to the width W1 of the host vehicle 1.

Assuming that the maximum offset area OZ when a central axis of the preceding vehicle 2 is on the same line as the central axis of the host vehicle 1 is '100', the offset area OZ may gradually decrease as the preceding vehicle 2 moves toward one of the next lane lines, LL or RL. That is, the offset area OZ may gradually decrease to '90', '60', and '30' as the preceding vehicle 2 moves toward one of the next lane lines, LL or RL.

When the offset area OZ is less than the maximum offset area, for example in a situation where the preceding vehicle 2 is moving from the traveling lane toward one of the next lane lines LL or RL to change lanes, the target inter-vehicle distance between the host vehicle 1 and the preceding vehicle 2 may be reduced so that the host vehicle 1 may be advanced further forward, for example by acceleration of the host vehicle 1.

When the offset area OZ decreases, it may be determined that the preceding vehicle 2 is moving from the traveling lane toward the next lane line to change lanes. Thus, a higher rate of change in which the offset area OZ decreases may indicate a faster speed at which the preceding vehicle 2 is laterally moving to change lanes.

As described above, the driver assistance apparatus 100 may identify the extent to which the preceding vehicle 2 deviates laterally from the host vehicle 1 based on the offset area OZ. For example, it may be determined that the preceding vehicle 2 is increasingly deviating laterally from the host vehicle 1 based on the offset area OZ decreasing.

With reference back to FIG. 4, the driver assistance apparatus 100 compares the offset area OZ of the preceding vehicle relative to the host vehicle with a reference area, which may be pre-configured, to identify whether the offset area OZ is less than the reference area (304).

When the offset area OZ is not less than the reference area (304 and NO), the driver assistance apparatus 100 maintains the target inter-vehicle distance between the host vehicle 1 and the preceding vehicle 2 at the original target inter-vehicle distance (306).

However, when the offset area OZ is less than the reference area (304 and YES), the driver assistance apparatus 100 may reduce the target inter-vehicle distance between the host vehicle 1 and the preceding vehicle 2 (308). The target inter-vehicle distance between host vehicle 1 and preceding vehicle 2 is reduced to an inter-vehicle distance value that is less than the currently set target inter-vehicle distance.

When the offset area OZ is less than the reference area, which may indicate that the preceding vehicle 2 is moving from the traveling lane to the next lane line to change lanes, the target inter-vehicle distance between the host vehicle 1 and the preceding vehicle 2 may be reduced so that the host vehicle 1 may be advance further forward, for example by acceleration of the host vehicle 1. Additionally, when the offset area OZ is changed from being greater than the reference area to being less than the reference area, it may indicate that the preceding vehicle 2 is moving from the traveling lane to the next lane line to change lanes. That is, the higher rate of decrease in the offset area OZ may correspond to a faster speed at which the preceding vehicle 2 is laterally moving to change lanes.

FIG. 6 is a view of an example of calibration of the target inter-vehicle distance based on an offset area of the preceding vehicle relative to the host vehicle according to one embodiment.

With reference to FIG. 6, the driver assistance apparatus 100 may maintain the target inter-vehicle distance at a first target inter-vehicle distance (a target inter-vehicle distance set by the driver) when the offset area OZ is a first area (e.g., OZ≥90).

The driver assistance apparatus 100 may reduce the target inter-vehicle distance to a second target inter-vehicle distance based on a factor such as a multiplier (e.g., a target inter-vehicle distance set by the driver*0.9) when the offset area OZ is a second area (e.g., 60≤OZ<90).

The driver assistance apparatus 100 may reduce the target inter-vehicle distance to a third target inter-vehicle distance based on another factor such as a multiplier (e.g., a target inter-vehicle distance set by the driver*0.8) when the offset area OZ is a third area (e.g., 30≤OZ<60).

The driver assistance apparatus 100 may reduce the target inter-vehicle distance to a fourth target inter-vehicle distance based on another factor such as a multiplier (e.g., a target inter-vehicle distance set by the driver*0.7) when the offset area OZ is a fourth area (e.g., 0<OZ<30).

In some embodiments, the driver assistance apparatus 100 may restore the target inter-vehicle distance to the original target inter-vehicle distance set by the driver when the offset area OZ is 0 (OZ=0) once the lane change of the preceding vehicle 2 is complete.

FIGS. 7 to 10 are views illustrating an example of operations for calibration of a target inter-vehicle distance based on an offset area of the preceding vehicle relative to the host vehicle according to one embodiment.

Figure 7:
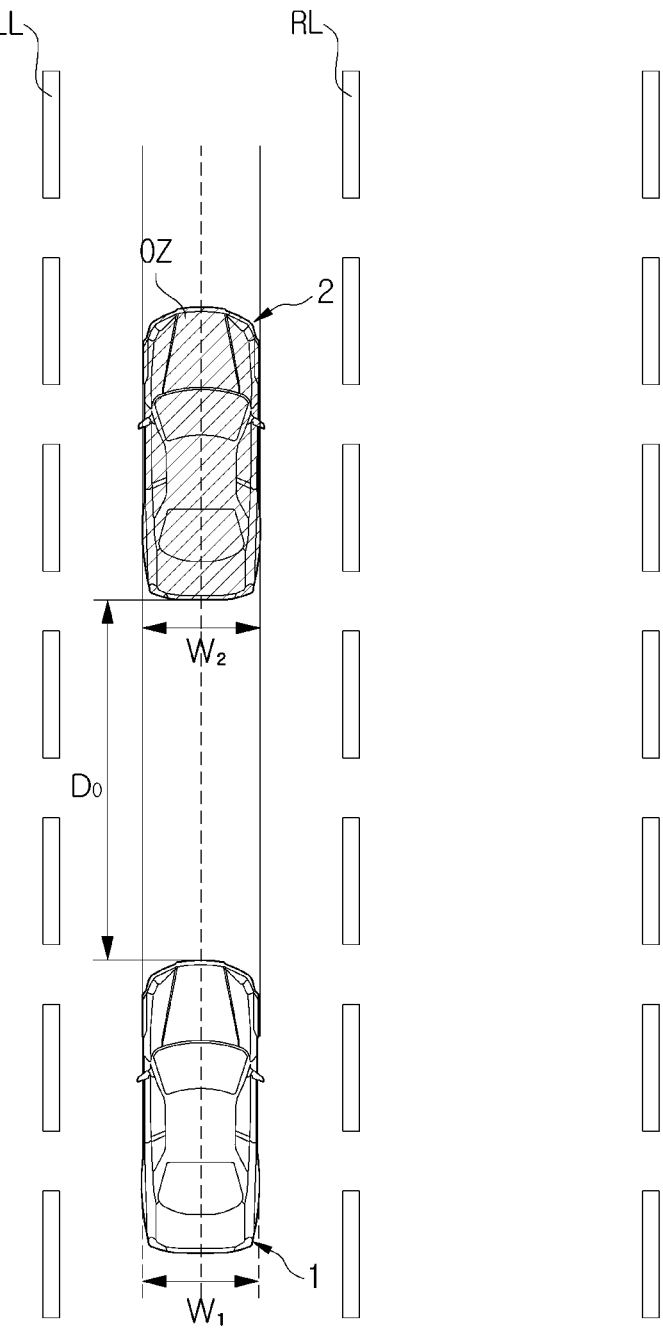
FIGS. 7 to 10 are views illustrating a series of operations that calibrate a target inter-vehicle distance based on the offset area of the preceding vehicle relative to the host vehicle in the driver assistance apparatus according to one embodiment.

With reference to FIG. 7, the driver assistance apparatus 100 may maintain the target inter-vehicle distance between the host vehicle 1 and the preceding vehicle 2 at a target inter-vehicle distance DO set by the driver when the offset area OZ is the first area (90 or more).

In this case, when the preceding vehicle 2 moves toward the right to change lanes, the offset area OZ is reduced to the second area (60 to 90) from the first area.

Figure 8:
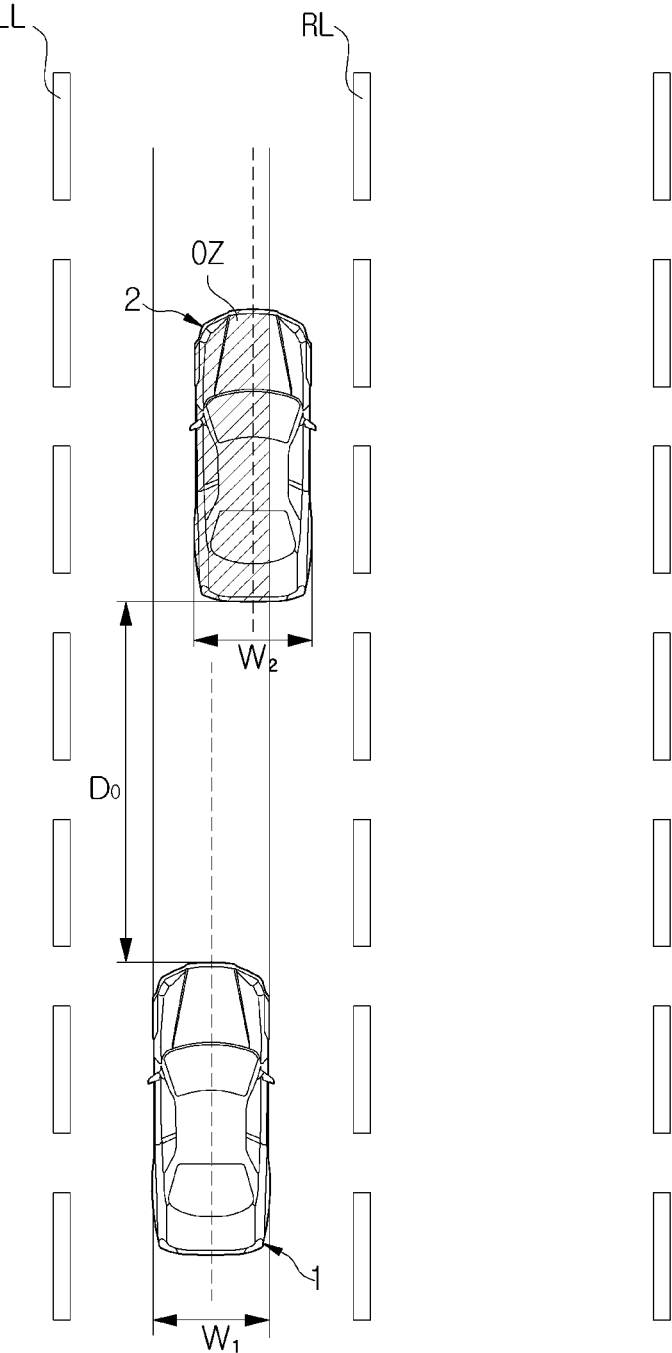

With reference to FIG. 8, the driver assistance apparatus 100 may reduce the target inter-vehicle distance between the host vehicle 1 and the preceding vehicle 2 from the target inter-vehicle distance DO set by the driver to a smaller target inter-vehicle distance D0*0.9 when the offset area OZ decreases from the first area (90 or more) to the second area (60 to 90).

Figure 9:
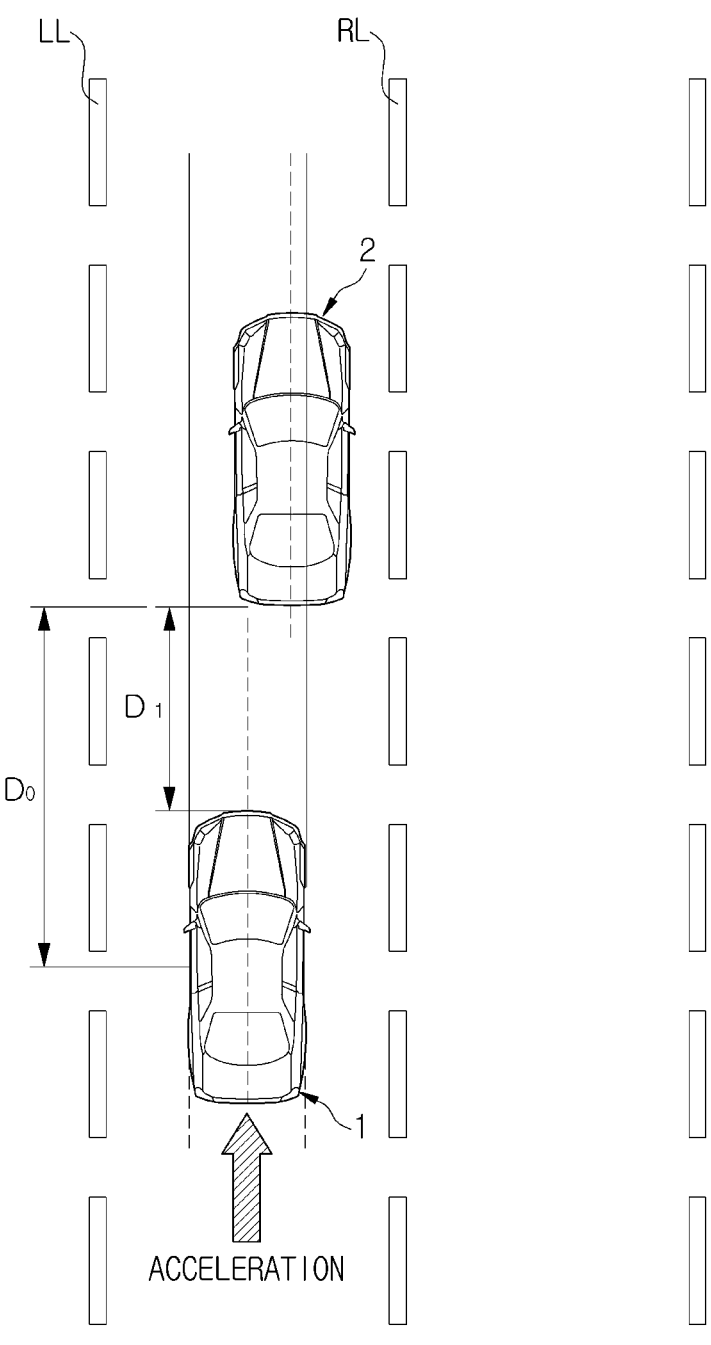

With reference to FIG. 9, according to the reduced target inter-vehicle distance, the driver assistance apparatus 100 may perform ACC control to accelerate the host vehicle 1 to achieve the reduced target inter-vehicle distance.

Figure 10:
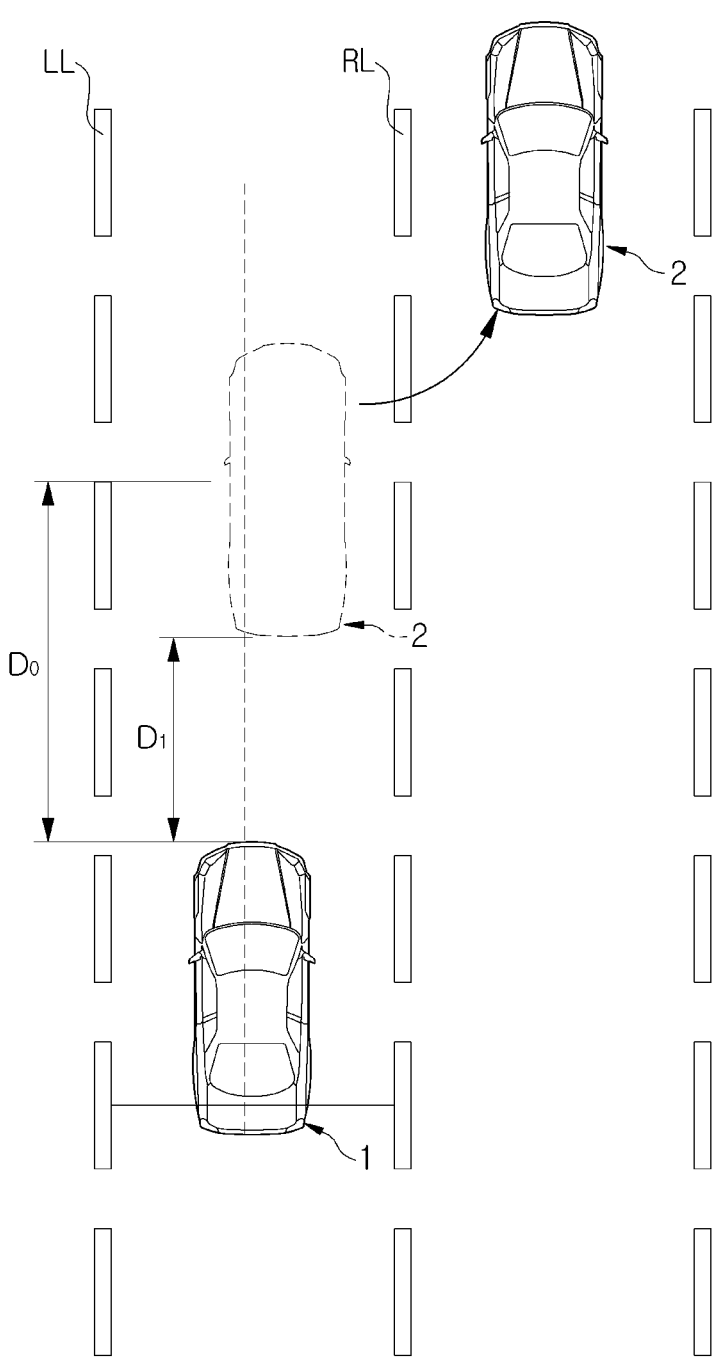

With reference to FIG. 10, the driver assistance apparatus 100 may restore the target inter-vehicle distance to the original target inter-vehicle distance DO set by the driver when the offset area OZ is 0 once the lane change of the preceding vehicle 2 is complete.

As is apparent from the above description, the driver assistance apparatus 100 may reduce the target inter-vehicle distance between the host vehicle 1 and the preceding vehicle 2 based on the offset area OZ of the preceding vehicle 2 relative to the host vehicle 1, and advance the host vehicle by performing ACC control based on the reduced target inter-vehicle distance. Thus, appropriate adjustment of the inter-vehicle distance may be achieved even when the preceding vehicle has not completely left the traveling lane, thereby minimizing the driver's sense of unease.

Meanwhile, the above-described controller and/or the component elements thereof may include one or more processor(s)/microprocessor(s) coupled with a computer-readable recording medium that stores computer-readable code/algorithms/software. The processor/microprocessor(s) may execute computer-readable code/algorithms/software that is stored on a computer-readable recording medium to perform the above-described functions, operations, steps, etc.

The above-described controller and/or the component elements thereof may further include a computer-readable non-transitory storage medium or a memory implemented as a computer-readable transitory storage medium. The memory may be controlled by the above-described controller and/or the constituent elements thereof, and may be constituted to store data transmitted to or received from the above-described controller and/or the constituent elements thereof, or may be constituted to store data processed or to be processed by the above-described controller and/or the constituent elements thereof.

The disclosed embodiments are also capable of being implemented as computer-readable code/algorithms/soft-ware on a computer-readable recording medium. The com-puter-readable recording medium may be a non-transitory, computer-readable recording medium, such as a data storage device capable of storing data that can be read by a proces-sor/microprocessor. Examples of the computer-readable recording media include a hard disk drive (HDD), a solid state drive (SSD), a silicon disk drive (SDD), a read-only memory (ROM), a CD-ROM, a magnetic tape, a floppy disk, and an optical data storage device, etc.

Although embodiments have been described with refer-ence to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings, and the appended claims. In addi-tion to variations and modifications in the component parts and/or arrangements, alternative uses will also be apparent to those skilled in the art.

What is claimed is:

1. A driver assistance apparatus comprising:
a camera configured to obtain image data with a forward field of view of a host vehicle;
a radar configured to obtain radar data with a sensing field of view in a vicinity of the host vehicle; and
a controller electrically connected to the camera and the radar,
wherein the controller is configured to:
detect a preceding vehicle traveling in front of the host vehicle based on at least one of the image data or the radar data;
obtain a lateral position of the preceding vehicle relative to the host vehicle while performing adaptive cruise control (ACC) to maintain a target inter-vehicle dis-tance between the host vehicle and the preceding vehicle;
identify a lateral deviation of the preceding vehicle rela-tive to the host vehicle while performing ACC;
identify an offset area of the preceding vehicle relative to the host vehicle based on the lateral position of the preceding vehicle and a vehicle width of the host vehicle; and
calibrate the target inter-vehicle distance between the host vehicle and the preceding vehicle based on the offset area,
wherein the controller is further configured to maintain the target inter-vehicle distance at a first target inter-vehicle distance when the offset area is a first area, to reduce the target inter- vehicle distance to a second target inter-vehicle distance when the offset area is a second area, to reduce the target inter-vehicle distance to a third target inter-vehicle distance when the offset area is a third area, and to reduce the target inter-vehicle distance to a fourth target inter-vehicle distance when the offset area is a fourth area.

2. The driver assistance apparatus of claim 1, wherein the controller is further configured to obtain the lateral position of the preceding vehicle relative to the host vehicle to identify the lateral deviation of the preceding vehicle.

3. The driver assistance apparatus of claim 2, wherein the lateral position of the preceding vehicle relative to the host vehicle is based on a vehicle width of the preceding vehicle and a distance between a central axis of the host vehicle and a central axis of the preceding vehicle.

4. The driver assistance apparatus of claim 2, wherein the controller is further configured to identify the lateral devia-tion of the preceding vehicle based on the offset area.

5. The driver assistance apparatus of claim 4, wherein the offset area of the preceding vehicle relative to the host vehicle is an area in which a width of the host vehicle laterally overlaps with a width the preceding vehicle with respect to forward alignment of the preceding vehicle and the host vehicle.

6. The driver assistance apparatus of claim 4, wherein the offset area decreases as the lateral deviation of the preceding vehicle increases.

7. The driver assistance apparatus of claim 1, wherein the lateral deviation of the preceding vehicle comprises at least one of an extent to which the preceding vehicle deviates from a center of a traveling lane or an extent to which the preceding vehicle leaves the traveling lane.

8. The driver assistance apparatus of claim 1, wherein the target inter-vehicle distance is calibrated based on the offset area to be decreased from a target inter-vehicle distance set by a driver.

9. The driver assistance apparatus of claim 8, wherein the target inter-vehicle distance is calibrated to be further decreased as the offset area decreases.

10. The driver assistance apparatus of claim 1, wherein the controller is configured to:
maintain the target inter-vehicle distance at a target inter-vehicle distance set by a driver when the offset area is greater than or equal to 90; reduce the target inter-vehicle distance to a target inter-vehicle distance set by the driver multiplied by 0.9 when the offset area is greater than or equal to 60 and less than 90; reduce the target inter-vehicle distance to a target inter-vehicle distance set by the driver multiplied by 0.8 when the offset area is greater than or equal to 30 and less than 60; and reduce the target inter-vehicle distance to a target inter-vehicle distance set by a driver multiplied by 0.7 when the offset area is greater than 0 and less than 30.

11. A driver assistance method comprising:
detecting a preceding vehicle traveling in front of a host vehicle;
obtaining a lateral position of the preceding vehicle relative to the host vehicle while performing adaptive cruise control (ACC) to maintain a target inter-vehicle distance between the host vehicle and the preceding vehicle;
identifying a lateral deviation of the preceding vehicle relative to the host vehicle while performing ACC:
identifying an offset area of the preceding vehicle relative to the host vehicle based on the lateral position of the preceding vehicle and a vehicle width of the host vehicle; and
calibrating the target inter-vehicle distance between the host vehicle and the preceding vehicle based on the offset area,
wherein the controller is further configured to maintain the target inter-vehicle distance at a first target inter-vehicle distance when the offset area is a first area, to reduce the target inter-vehicle distance to a second target inter-vehicle distance when the offset area is a second area, to reduce the target inter-vehicle distance to a third target inter-vehicle distance when the offset area is a third area, and to reduce the target inter-vehicle distance to a fourth target inter-vehicle distance when the offset area is a fourth area.

12. The driver assistance method of claim 11, further comprising obtaining the lateral position of the preceding vehicle for identifying the lateral deviation of the preceding vehicle.

13. The driver assistance method of claim 12, wherein identifying the lateral deviation of the preceding vehicle is based on obtaining a vehicle width of the preceding vehicle and a distance between a central axis of the host vehicle and a central axis of the preceding vehicle.

14. The driver assistance method of claim 12, wherein identifying the lateral deviation of the preceding vehicle comprises:

identifying an offset area of the preceding vehicle relative to the host vehicle.

15. The driver assistance method of claim 14, wherein the offset area decreases as the lateral deviation of the preceding vehicle increases.

16. The driver assistance method of claim 11, wherein the identifying the lateral deviation of the preceding vehicle comprises identifying at least one of an extent to which the preceding vehicle deviates from a center of a traveling lane or an extent to which the preceding vehicle leaves the traveling lane.

17. The driver assistance method of claim 11, wherein the target inter-vehicle distance is calibrated based on the offset area to be decreased from a target inter-vehicle distance set by a driver.

18. The driver assistance method of claim 17, wherein the target inter-vehicle distance is calibrated to be further decreased as the offset area decreases.

* * * * *